United States Patent [19]
Cho et al.

[11] Patent Number: 5,633,706
[45] Date of Patent: May 27, 1997

[54] OPTICAL DISTANCE MEASUREMENT APPARATUS AND METHOD

[75] Inventors: Jung S. Cho; Young B. Im, both of Kyoungki-do, Rep. of Korea

[73] Assignee: Hyundai Electronics Industries Co., Ltd., Kyoungki-do, Rep. of Korea

[21] Appl. No.: 345,787

[22] Filed: Nov. 22, 1994

[30] Foreign Application Priority Data

| Dec. 27, 1993 | [KR] | Rep. of Korea | 93-29737 |
| Dec. 27, 1993 | [KR] | Rep. of Korea | 93-29740 |
| Dec. 29, 1993 | [KR] | Rep. of Korea | 93-30539 |
| Dec. 29, 1993 | [KR] | Rep. of Korea | 93-30540 |
| Dec. 29, 1993 | [KR] | Rep. of Korea | 93-30570 |

[51] Int. Cl.$^6$ .................... G01C 3/08; B60T 7/16
[52] U.S. Cl. .................... 356/5.01; 180/169; 356/5.06; 356/5.1
[58] Field of Search .................... 356/4.02, 5.05, 356/5.06, 5.07, 5.08, 5.01, 5.1; 180/169

[56] References Cited

U.S. PATENT DOCUMENTS

| 3,751,166 | 8/1973 | Starkey et al. |  |
| 4,113,381 | 9/1978 | Epstein |  |
| 4,288,158 | 9/1981 | Frungel |  |
| 4,477,184 | 10/1984 | Endo | 180/169 |
| 4,511,249 | 4/1985 | Frungel et al. |  |
| 5,091,726 | 2/1992 | Shyu |  |
| 5,160,971 | 11/1992 | Koshizawa | 356/5.05 |
| 5,204,732 | 4/1993 | Ohmanyuda et al. |  |
| 5,216,259 | 6/1993 | Stern et al. | 250/561 |
| 5,225,882 | 7/1993 | Hosokawa et al. |  |
| 5,262,837 | 11/1993 | Shyy |  |

*Primary Examiner*—Stephen C. Buczinski
*Attorney, Agent, or Firm*—Wigman, Cohen, Leitner & Myers, P.C.

[57] ABSTRACT

An optical distance measurement apparatus comprises a system controller for controlling the entire operation of a system, a light emitting circuit for emitting a high-power pulse light beam as a distance measuring medium to an object in response to a drive signal from the system controller, a light receiving circuit for receiving a light beam reflected from the object, a trigger signal generation circuit for generating a trigger signal indicative of a start time point for measurement of a light moving time, and a time-distance conversion circuit for measuring the light moving time in response to the trigger signal from the trigger signal generation circuit and in response to an output signal from the light receiving circuit, and for converting the measured light moving time into a distance to the object. The time-distance conversion circuit obtains a time difference between the trigger signal from the trigger signal generation circuit and the output signal from the light receiving circuit and converts the obtained time difference into the distance to the object.

11 Claims, 10 Drawing Sheets

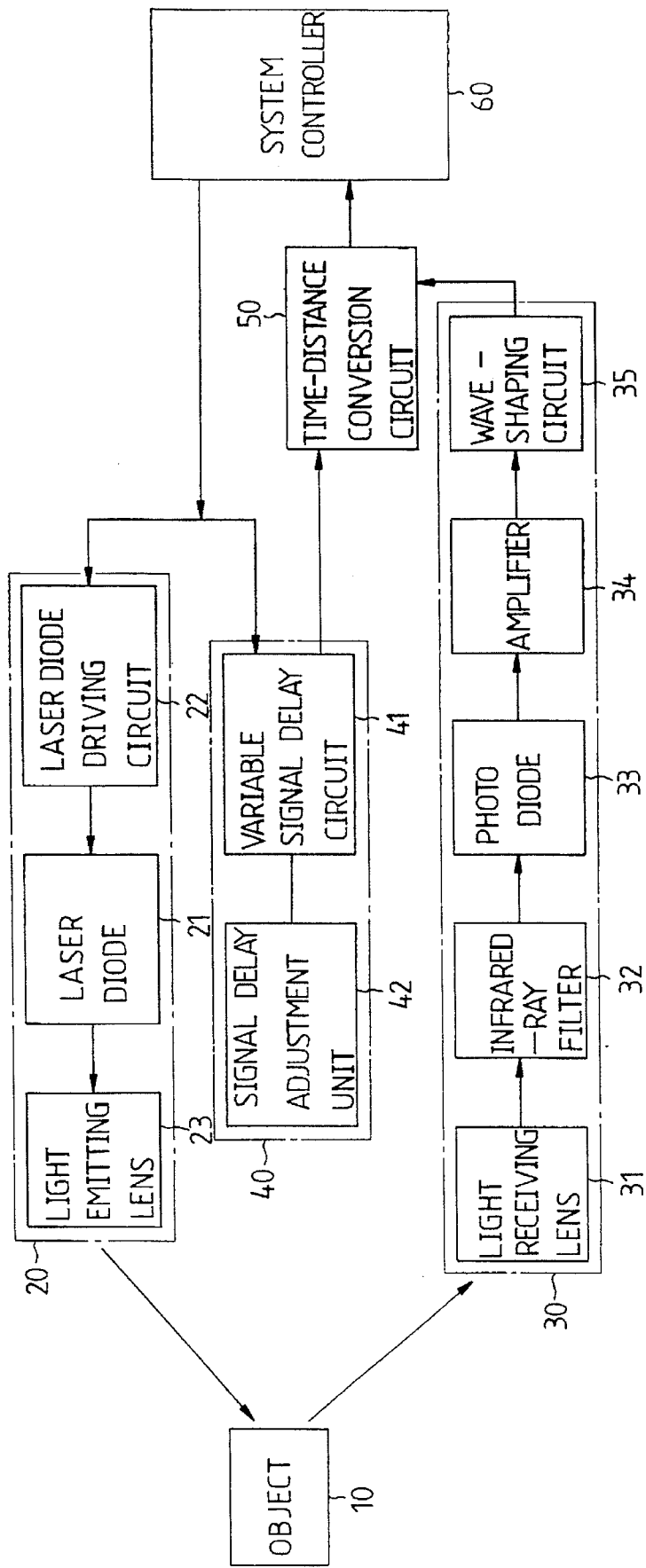

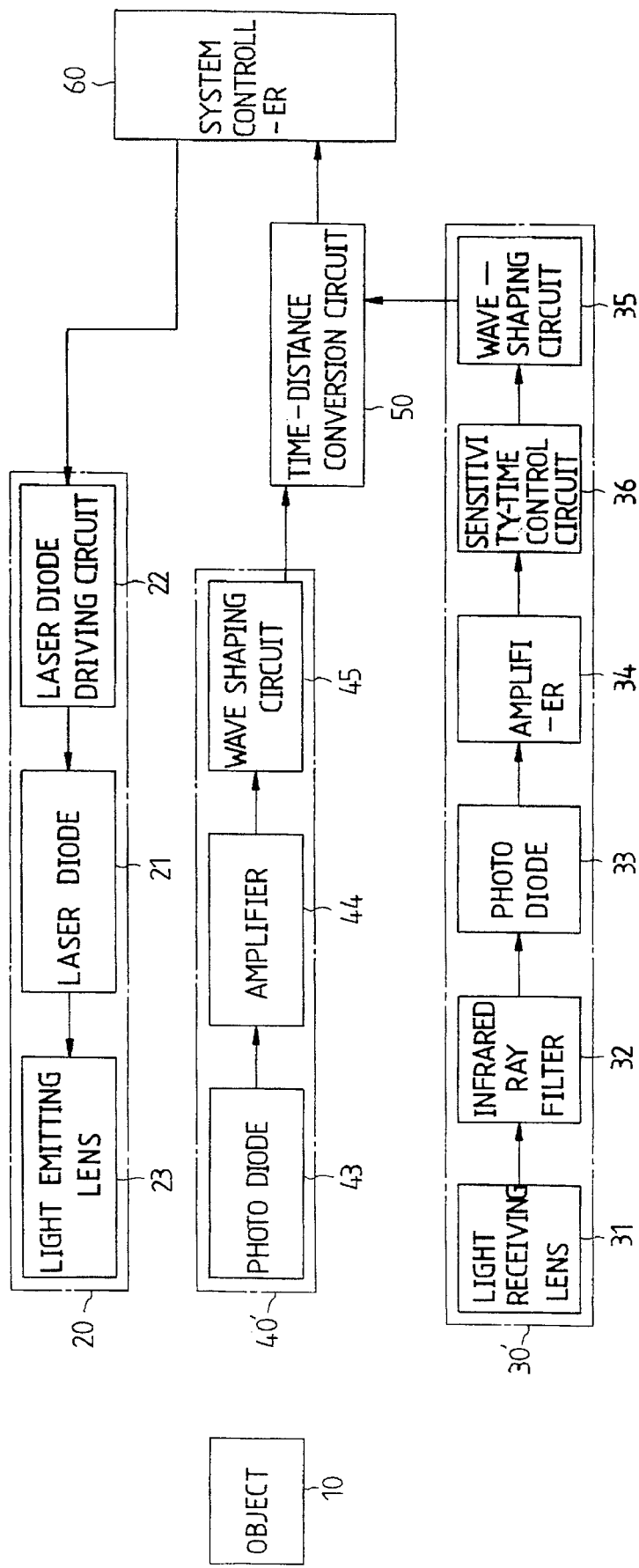

OPTICAL DISTANCE MEASUREMENT APPARATUS AND METHOD

BACKGROUND OF THE INVENTION

1. Field of the Invention

The present invention relates in general to distance measurement using a light beam, and more particularly to an optical distance measurement apparatus and method in which a distance to an object can be measured with no contact using a light beam by measuring a pure light moving time precisely, so that they are applicable to various distance measurements including a distance measurement of a car collision prevention system.

2. Description of the Prior Art

Conventional distance measurement equipments are mostly adapted to measure distances to objects relatively using standard measurement devices with corresponding lengths.

Such a conventional distance measurement equipment utilizes trigonometry for the distance measurement. For this reason, the conventional distance measurement equipment needs a relative measurement device with a length corresponding to the distance to be measured, or many measurement devices to calculate the distance. As a result, the conventional distance measurement equipment is complex in construction. In particular, it is impossible to install the conventional distance measurement equipment in a car for the purpose of measuring continuously the distance traveled by of the car.

To solve the above problems, there have been proposed optical distance measurement apparatus. Such a conventional optical distance measurement apparatus measures a light moving time and then the distance to the object on the basis of the measured light moving time and a light velocity. Precision in the distance measurement is dependent on accuracy in the light moving time measurement. However, since a light beam moves 30 cm for 1 nsec, it is very hard to measure accurately the light moving time.

Also, the conventional optical distance measurement apparatus is adapted to emit a pulse light beam to the object, convert a light beam reflected from the object into an electrical signal, and amplify the converted electrical signal, so as to measure the light moving time using the amplified electrical signal. Here, the pulse light beam is emitted to the object by light emitting means and the light beam reflected from the object is received by light receiving means. Noticeably, an intensity of the pulse light beam emitted from the light emitting means is rapidly reduced as the distance to the object is increased, thereby causing the reflected light beam received by the light receiving mean to be rapidly reduced in amount. Also, the light receiving means must detect a peak point of the pulse light beam, emitted from the light emitting means, for the distance measurement. For this reason, a distance error is generated in emitting and receiving the pulse light beam. Further, in the case where amplification of the same degree is applied for every distance, a measurable range of the distance is very short or the distance measurement cannot be performed.

SUMMARY OF THE INVENTION

Therefore, the present invention has been made in view of the above problems, and it is an object of the present invention to provide an optical distance measurement apparatus and method in which a distance to an object can be measured with no contact using a light beam by measuring a pure light moving time precisely, so that they are applicable to various distance measurements including a distance measurement of a car collision prevention system.

In accordance with one aspect of the present invention, there is provided an optical distance measurement apparatus comprising system control means for controlling the entire operation of a system; light emitting means for emitting a high-power pulse light beam as a distance measuring medium and for transmitting same to an object in response to a drive signal from said system control means; light receiving means for receiving a light beam reflected from the object; trigger signal generation means for generating a trigger signal indicative of a start time point for measurement of a light moving time; and time-distance conversion means for measuring the light moving time in response to the trigger signal from said trigger signal generation means and an output signal from said light receiving means, and for converting the measured light moving time into a distance to the object.

In accordance with another aspect of the present invention, there is provided an optical distance measurement method comprising the steps of (a) initializing a system and performing a self-diagnostic operation to check whether the system is normal; (b) stopping an operation of the system if it is determined at said step (a) that the system is not normal; (c) emitting a high-power pulse light beam to an object if it is determined at said step (a) that the system is normal, and then generating a trigger signal; and (d) obtaining a time difference between the generated trigger signal and a signal of a light beam reflected from the object, and converting the obtained time difference into a distance to the object.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of an optical distance measurement apparatus in accordance with a first embodiment of the present invention;

FIG. 2A is a block diagram of an optical distance measurement apparatus in accordance with a second embodiment of the present invention;

DETAILED DESCRIPTION OF THE INVENTION

Figure 2B:
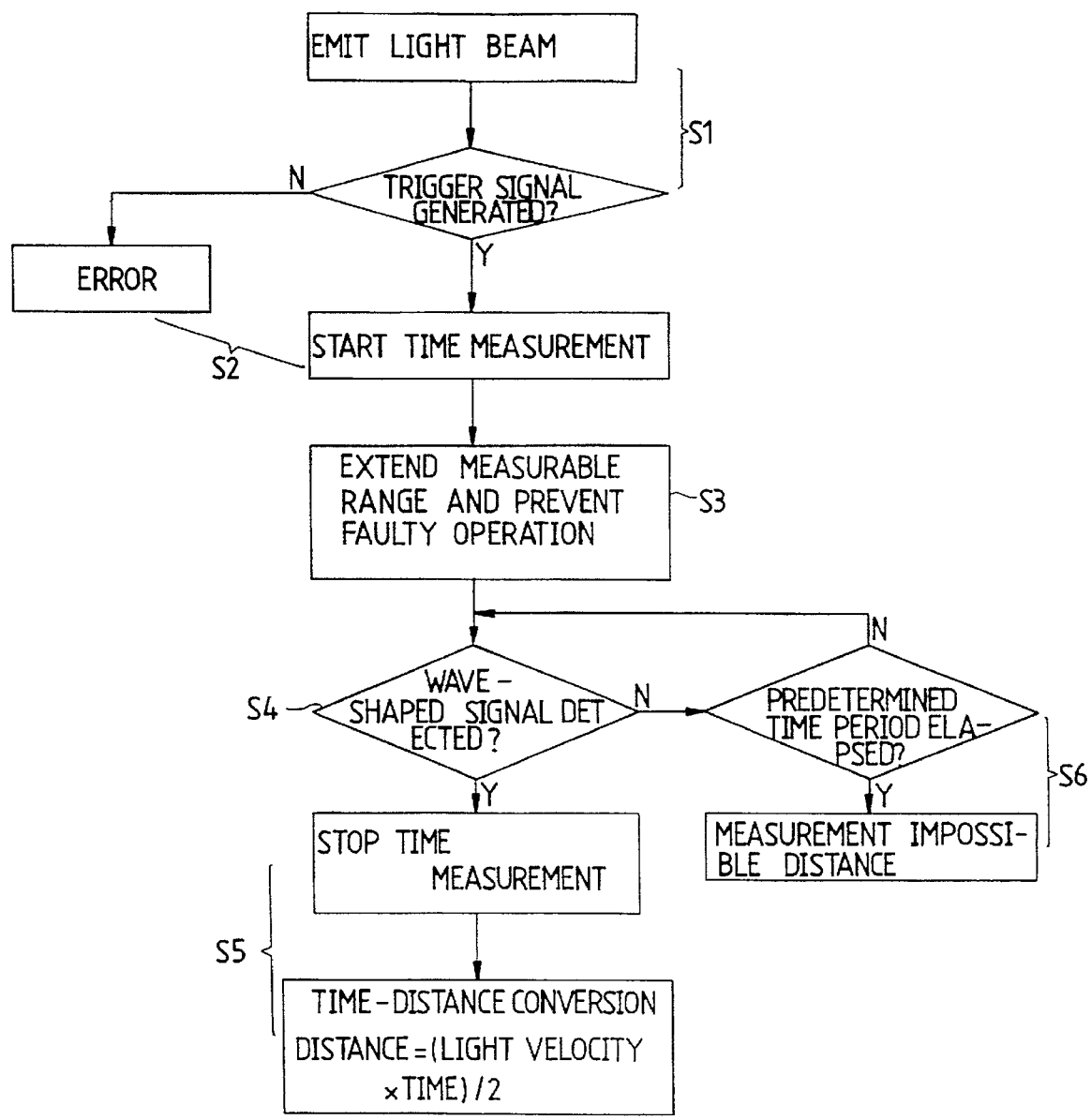
FIG. 2B is a flowchart illustrating an optical distance measurement method in accordance with the second embodiment of the present invention.

Referring to FIG. 1, there is shown a block diagram of an optical distance measurement apparatus in accordance with a first embodiment of the present invention. As shown in this drawing, the optical distance measurement apparatus comprises a system controller 60 for controlling the entire operation of a system, a light emitting circuit 20 for emitting a high-power pulse light beam as a distance measuring medium and directing same to an object 10 in response to a drive signal from the system controller 60, and a light receiving circuit 30 for receiving a light beam reflected from the object 10.

A trigger signal generation circuit 40 is adapted to generate a trigger signal in response to the drive signal from the system controller 60. The trigger signal from the trigger signal generation circuit 40 indicates a start time point for measurement of a light moving time.

A time-distance conversion circuit 50 is adapted to measure the light moving time in response to the trigger signal from the trigger signal generation circuit 40 and an output signal from the light receiving circuit 30, and to convert the measured light moving time into a distance to the object 10.

The light emitting circuit 20 includes a laser diode 21 as a light source for producing the high-power pulse light beam, a laser diode driving circuit 22 for driving the laser diode 21 in response to the drive signal from the system controller 60, and a light emitting lens 23 for focusing the light beam from the laser diode 21 and diffusing the focused light beam at a desired angle to emit it and direct it toward the object 10.

The light receiving circuit 30 includes a light receiving lens 31 for condensing the light beam reflected from the object 10, an infrared-ray filter 32 for filtering by passing only a part of the light beam condensed by the light receiving lens 31, corresponding to the light beam emitted from the light emitting circuit 20, to remove an external light beam therefrom, and a photo diode 33 for performing a photoelectric conversion operation for the light beam filtered by the infrared-ray filter 32 to produce an electrical signal.

Also, the light receiving circuit 30 includes an amplifier 34 for amplifying the electrical signal from the photo diode 33, and a wave-shaping circuit 35 for converting an output signal from the amplifier 34 into a digital signal, and for outputting the converted digital signal to the time-distance conversion circuit 50.

The trigger signal generation circuit 40 includes a variable signal delay circuit 41 for delaying the drive signal from the system controller 60 for a desired time and outputting the delayed drive signal as the trigger signal to the time-distance conversion circuit 50, and a signal delay adjustment unit 42 for varying a time constant of the variable signal delay circuit 41 to adjust the delay time thereof.

The operation of the optical distance measurement apparatus with the above-mentioned construction in accordance with the first embodiment of the present invention will hereinafter be described in detail.

A main feature of the first embodiment of the present invention is that generation of a distance error due to various time delays for an interval from the emission of the pulse light beam from the light emitting circuit 20 until the recognition of the light beam received by the light receiving circuit 30 as the digital signal can be prevented by adjusting the time constant of the trigger signal generation circuit 40 which generates the trigger signal indicative of the emission time point of the pulse light beam, with no modification of hardware and software. In other words, the emission time point of the pulse light beam can simply be adjusted for compensation for the time delays. This has the effect of resolving a productivity reduction problem in the case of modifying the hardware and software.

In measuring the distance using the light beam as the distance measuring medium, it is most important to calculate purely the light moving time. In other words, the light beam has a very rapid moving characteristic in that it moves 30 cm for 1 nsec. For this reason, provided that a time error of 10 nsec is generated in measuring the distance using the light beam, a round distance error is 300 cm or 3 m. By the way, most passive elements have delay characteristics of 10 nsec or more, each of which is not a constant. As a result, a separate adjustment must be applied for every product, for compensation for the delay characteristics. It should be noted that the delay characteristics can be compensated for by the software or the hardware only when they are constants.

In accordance with the first embodiment of the present invention, the above problem can be solved by adjusting the start time point for the measurement of the light moving time by means of the signal delay adjustment unit 42 for every product. The use of the signal delay adjustment unit 42 has the effect of enhancing a precision of the product.

In operation, the system controller 60 applies the drive signal to the laser diode driving circuit 22 in the light emitting circuit 20 and simultaneously to the variable signal delay circuit 41 in the trigger signal generation circuit 40.

Upon receiving the drive signal from the system controller 60, the laser diode driving circuit 22 drives the laser diode 21 to emit the high-power pulse light beam and to direct it to the object 10. In practice, the variable signal delay circuit 41 delays the drive signal from the system controller 60 for the time period during which the pulse light beam from the laser diode 21 is passed through the light emitting lens 23. The variable signal delay circuit 41 then sends the delayed drive signal as the trigger signal to the time-distance conversion circuit 50. The time-distance conversion circuit 50 begins to measure the light moving time upon receiving the trigger signal from the variable signal delay circuit 41 and stops the measuring operation upon receiving the output signal from the wave-shaping circuit 35 in the light receiving circuit 30. Then, the time-distance conversion circuit 50 converts the measured light moving time into a light round moving distance to the object 10.

The distance to the object 10 is obtained by multiplying the measured light moving time by a light velocity and dividing the resultant value by 2. The obtained distance may include a distance error resulting from various delay factors, not corrected. Such a distance error can readily be corrected on the basis of comparison of the measured distance with an actual distance by the signal delay adjustment unit 42 in the trigger signal generation circuit 40. This correction may be performed in a correcting process of a manufacturing line.

Namely, when the measured distance is longer than the actual distance, the signal delay adjustment unit 42 adjusts the delay time of the variable signal delay circuit 41 such that it becomes longer. On the contrary, when the measured distance is shorter than the actual distance, the signal delay adjustment unit 42 adjusts the delay time of the variable signal delay circuit 41 such that it becomes shorter. In this manner, the start time point for the measurement of the light moving time can be adjusted, resulting in improvement in the precision.

Referring to FIG. 2A, there is shown a block diagram of an optical distance measurement apparatus in accordance with a second embodiment of the present invention. The construction of the second embodiment of the present invention as shown in FIG. 2A is substantially the same as that of the first embodiment as shown in FIG. 1, with the exception that a light receiving circuit 30' and a trigger signal generation circuit 40' are provided instead of the light receiving circuit 30 and the trigger signal generation circuit 40. The light receiving circuit 30' includes a sensitivity time control circuit 36 in addition to the construction of the light receiving circuit 30. The sensitivity time control circuit 36 is connected between the amplifier 34 and the wave-shaping circuit 35 to increase an amplification degree of the output signal from the amplifier 34 in proportion to time. The trigger signal generation circuit 40' includes a photo diode 43 for monitoring the pulse light beam from the light emitting circuit 20 to recognize the light emission time point, an amplifier 44 for amplifying an output signal from the photo diode 43, and a wave-shaping circuit 45 for converting an output signal from the amplifier 44 into a digital signal and outputting the converted digital signal to the time-distance conversion circuit 50.

The operation of the optical distance measurement apparatus with the above-mentioned construction in accordance with the second embodiment of the present invention will hereinafter be described in detail with reference to FIGS. 3A to 4. FIGS. 3A to 3F are timing diagrams of the signals from the components in FIG. 2A, and FIG. 4 is a view illustrating a time-gain characteristic of the sensitivity time control circuit 36 in FIG. 2A.

The light emitting circuit 20 is adapted to emit the instantaneous high-power pulse light beam as the distance measuring medium and to direct same to the object 10. In order to emit the instantaneous high-power pulse light beam, the laser diode 21 is used as the light source in the light emitting circuit 20.

In the second embodiment of the present invention, a width and an amplitude of the pulse light beam emitted from the light emitting circuit 20 are important factors for enhancing a performance of the apparatus. In order to enhance the performance of the apparatus, the pulse light beam emitted from the light emitting circuit 20 is required to have a narrow width and a large amplitude, namely, large instantaneous light energy. Noticeably, the width of the pulse light beam affects the accuracy in the distance measurement and the amplitude thereof has an effect on a measurable range of the distance.

Therefore, the light emitting circuit 20 emits the pulse light beam as shown in FIG. 3A to the object 10 for the measurement of a desired distance. As shown in FIG. 3A, the pulse light beam has a desired amplitude and a very narrow width.

Figure 3A:
FIGS. 3A to 3F are timing diagrams of signals from components in FIG. 2A.
Figure 3B:
Figure 3C:
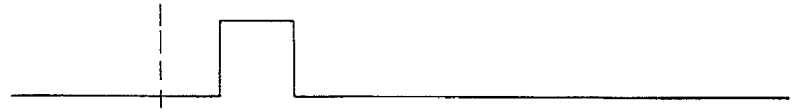
Figure 3D:
Figure 4:
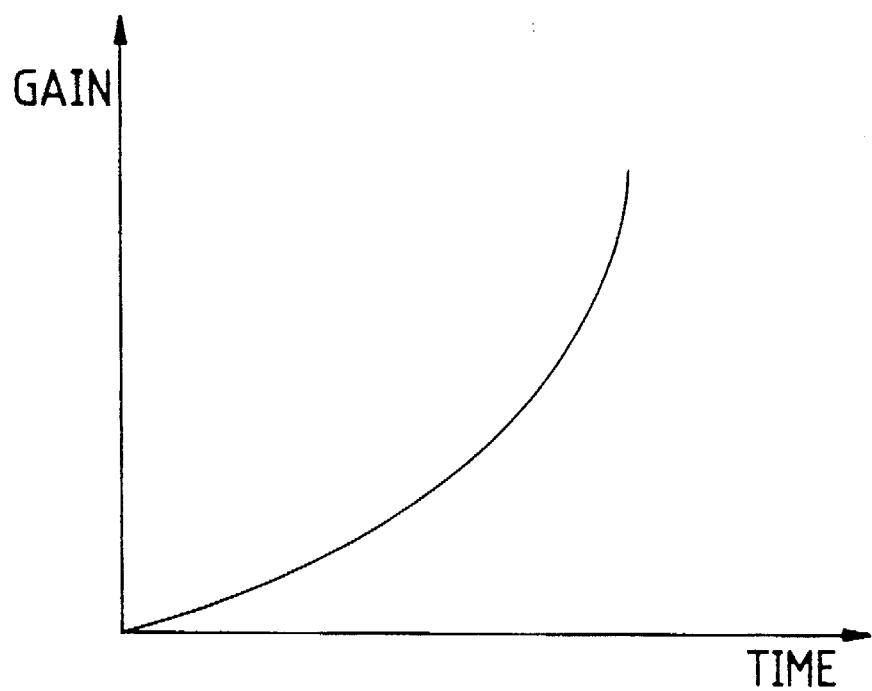
FIG. 4 is a view illustrating a time-gain characteristic of a sensitivity time control circuit in FIG. 2A.

The pulse light beam, as shown in FIG. 3A, emitted from the light emitting circuit 20, moves along a spatial distance to the object 10 and then impinges thereon. As a result, the light beam reflected from the object 10 as shown in FIG. 3D returns to the light receiving circuit 30'. Noticeably, the amplitude of the pulse light beam is varied with distance, but the width thereof has little variation because it is several tens of nanoseconds.

Figure 3E:

In the light receiving circuit 30', the light receiving lens 31 condenses the light beam, as shown in FIG. 3D, reflected from the object 10 and the infrared-ray filter 32 passes only the part of the light beam condensed by the light receiving lens 31, corresponding to the light beam emitted from the light emitting circuit 20, to remove the external light beam therefrom. The photo diode 33 converts the light beam filtered by the infrared-ray filter 32 into an electrical signal. The amplifier 34 amplifies the electrical signal from the photo diode 33 at the maximum and outputs the resultant voltage signal as shown in FIG. 3E.

A main feature of the second embodiment of the present invention is that the amplifier 34 of the light receiving circuit 30' amplifies the received light signal to a saturation state on the basis of the fundamental principle of the present invention which utilizes only a rising edge of the light beam. Namely, in the received light signal amplified to the saturation state by the amplifier 34, the original waveform is lost, but the rising edge has no variation. In other words, there is no variation in the fundamental information for the measurement of the distance to the object 10. Therefore, the second embodiment of the present invention measures the light moving time utilizing the above characteristic.

In the case where the second embodiment of the present invention is applied to a system utilizing a peak point of the received wave, a relatively low voltage can be required instead of a relatively high voltage as is well-known in the art.

The amplification degree of the received light signal amplified by the amplifier 34 is increased in proportion to time by the sensitivity time control circuit 36 with the gain variation characteristic as shown in FIG. 4. The use of the sensitivity time control circuit 36 has the effect of prevention the generation of the distance error in the case where the signal reflected along a long distance is not amplified to the saturation state by the amplifier 34. Namely, the use of the sensitivity time control circuit 36 makes it possible to extend a measurable range of the distance.

Figure 3F:
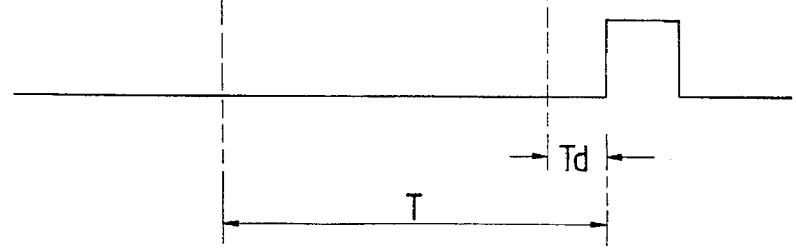

The output signal from the amplifier 34 is compared with a predetermined reference voltage by the wave-shaping circuit 35. In accordance with the compared result, the wave-shaping circuit 35 determines a position of the rising edge to be used and outputs the resultant digital signal as shown in FIG. 3F.

As stated previously with reference to the first embodiment of the present invention, in the case where the drive signal from the system controller 60 is used to indicate the start time point for the measurement of the light moving time, the start time point has the considerable difference from the light emission time point due to the time delays of the associated elements. Therefore, in accordance with the second embodiment of the present invention, there is employed a trigger signal generation circuit 40' having a light receiving construction of the same delay characteristic as that of the light receiving circuit 30'. Namely, in order to minimize the generation of the distance error resulting from the time delays of the circuit elements, the trigger signal generation circuit 40' is adapted to receive the pulse light beam from the laser diode 21 directly.

Upon receiving the drive signal from the system controller 60, the laser diode driving circuit 22 drives the laser diode 21 to emit the high-power pulse light beam and to direct same to the object 10. The time-distance conversion circuit 50 begins to measure the light moving time upon receiving the trigger signal as shown in FIG. 3C from the wave-shaping circuit 45 in the trigger signal generation circuit 40' and stops the measuring operation upon receiving the output signal as shown in FIG. 3F from the wave-shaping circuit 35 in the light receiving circuit 30+. Then, the time-distance conversion circuit 50 obtains the distance to the object 10 on the basis of the measured light moving time and the light velocity. Namely, the distance to the object 10 can be expressed by the following equation (1):

$$S = (T \times C)/2 [m] \quad (1)$$

where, S is the distance to the object 10, T is the light moving time and C is the light velocity (300000[km/s]).

Referring to FIG. 2B, there is shown a flowchart illustrating an optical distance measurement method in accordance with the second embodiment of the present invention. At the step S1, the laser diode is driven to emit the high-power pulse light beam and it is then determined whether the trigger signal is generated. If it is determined at the step S1 that the trigger signal is not generated, an error is indicated at the step S2. On the contrary, if it is determined at the step S1 that the trigger signal is generated, the light moving time measuring operation is started at the step S2. At the step S3, the sensitivity time control circuit 36 is driven to extend a measurable range of the distance and a faulty operation is prevented. It is determined at the step S4 whether the wave-shaped signal is detected. If it is determined at the step S4 that the wave-shaped signal is detected, the light moving time measuring operation is stopped and the measured light moving time is converted into the distance to the object 10 at the step S5. On the contrary, if it is determined at the step S4 that the wave-shaped signal is not detected, it is determined at the step S6 whether a predetermined time period has elapsed. Then at the step S6, if it is determined that the predetermined time period has not elapsed, the operation returns to the step S4 to determine whether the wave-shaped signal is detected. On the contrary, if it is determined that the predetermined time period has elapsed, the distance to the object is indicated as a measurement impossible one.

Figure 5:
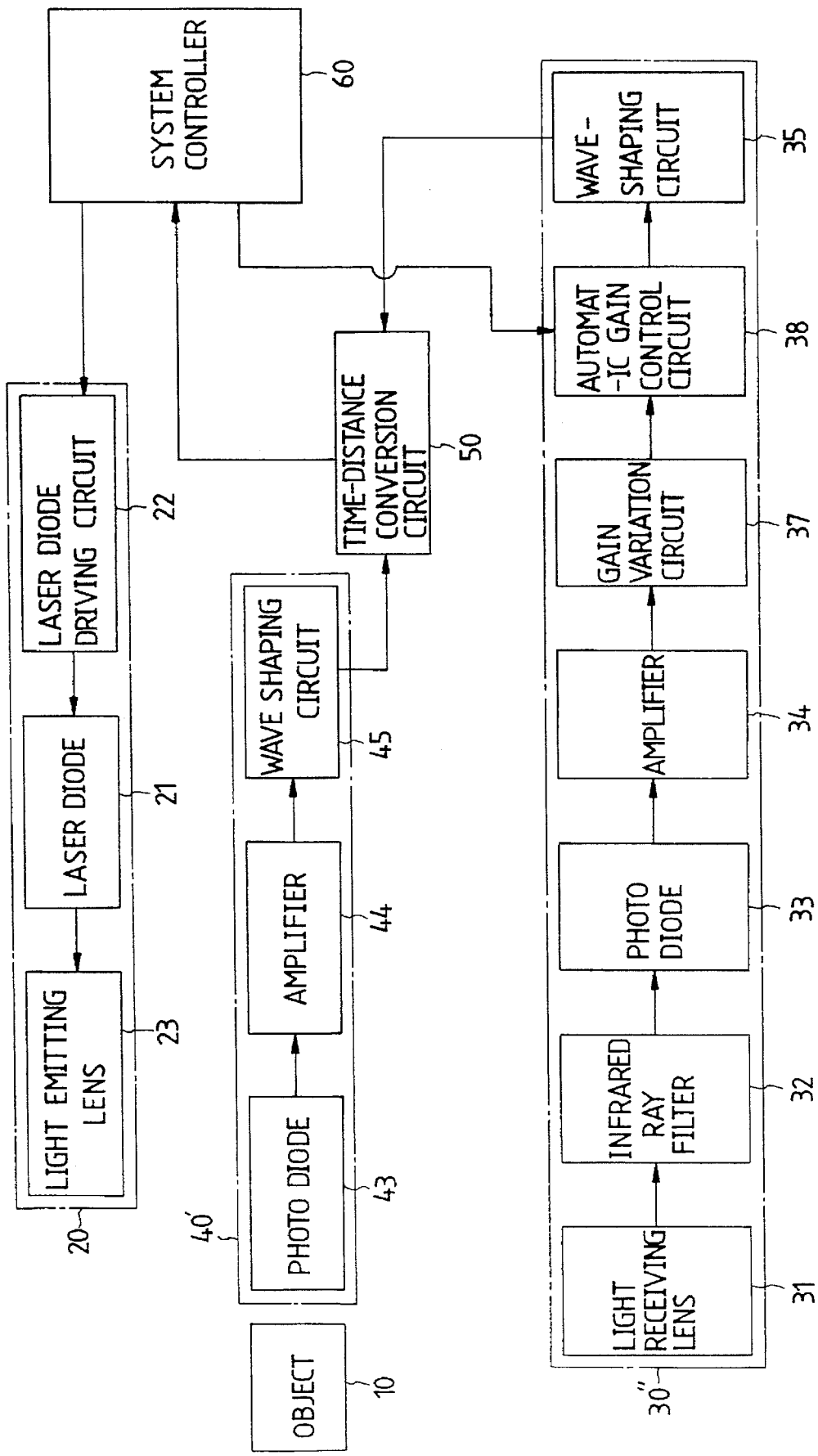
FIG. 5 is a block diagram of an optical distance measurement apparatus in accordance with a third embodiment of the present invention.

Referring to FIG. 5, there is shown a block diagram of an optical distance measurement apparatus in accordance with a third embodiment of the present invention. The construction of the third embodiment of the present invention as shown in FIG. 5 is substantially the same as that of the second embodiment as shown in FIG. 2A, with the exception that a light receiving circuit 30" is provided instead of the light receiving circuit 30'. The light receiving circuit 30" includes a gain variation circuit 37 and an automatic gain control circuit 38 connected between the amplifier 34 and the wave-shaping circuit 35 instead of the sensitivity time control circuit 36 in the light receiving circuit 30' The gain variation circuit 37 is adapted to increase a gain of the amplifier 34 with the lapse of time to prevent a short-distance error due to a fixed amplification degree. The automatic gain control circuit 38 is adapted to automatically control the gain of the amplifier 34 to make an output waveform from the gain variation circuit 37 constant.

Figure 6:
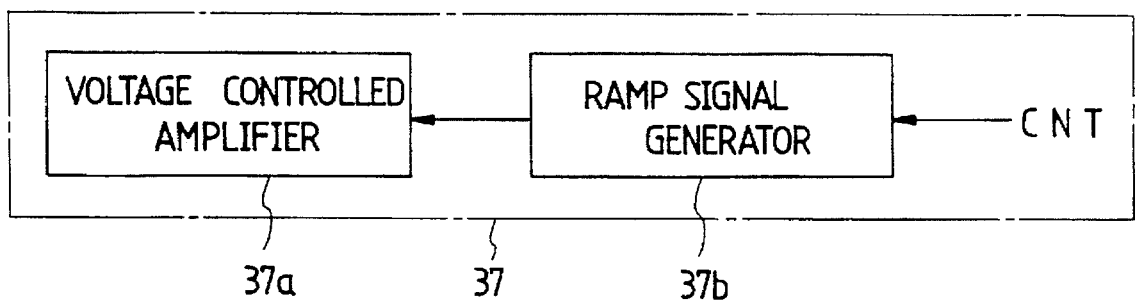
FIG. 6 is a detailed block diagram of a gain variation circuit in FIG. 5.

Referring to FIG. 6, there is shown a detailed block diagram of the gain variation circuit 37 in FIG. 5. As shown in this drawing, the gain variation circuit 37 includes a voltage controlled amplifier 37a for controlling the gain of the amplifier 34 in response to a voltage signal inputted thereto, and a ramp signal generator 37b for generating the voltage signal in response to a ramp control signal CNT and for outputting the generated voltage signal to the voltage controlled amplifier 37a to control an amplification degree thereof.

The operation of the optical distance measurement apparatus with the above-mentioned construction in accordance with the third embodiment of the present invention will hereinafter be described in detail.

Figure 7:
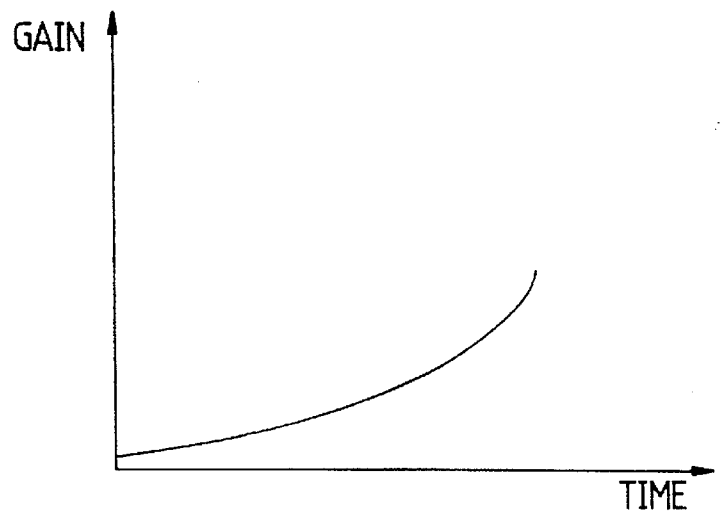
FIG. 7 is a view illustrating a time-gain characteristic of the gain variation circuit in FIG. 6.

The intensity of the pulse light beam emitted from the light emitting circuit 20 is reduced with the lapse of time. To solve this problem, the gain variation circuit 37 is provided in the light receiving circuit 30" to increase the gain of the amplifier 34 with the lapse of time. As a result, the gain of the amplifier 34 is varied with the lapse of time as shown in FIG. 7. The use of the gain variation circuit 37 has the effect of preventing a saturation state of the amplifier 34 due to a strong light beam reflected at a short distance. Also, the use of the gain variation circuit 37 has the effect of preventing a degradation in an amplification degree of a weak light beam resulting from reflection at a long distance. Namely, a variation in the intensity of the reflected light beam with distance is compensated by adjusting the gain of the amplifier 34.

In the gain variation circuit 37, the voltage controlled amplifier 37a controls the gain of the amplifier 34 in response to the voltage signal inputted thereto. The ramp signal generator 37b generates the voltage signal in response to the ramp control signal CNT and outputs the generated voltage signal to the voltage controlled amplifier 37a. As a result, the amplification degree of the voltage controlled amplifier 37a is controlled according to the voltage signal from the ramp signal generator 37b.

The received light signal is amplified by the amplifier 34 under the control of the gain variation circuit 37 so that a peak point thereof can be detected in a range of the distance to be measured. The automatic gain control circuit 38 is operated to make the amplitude of the received light signal constant so that a distance error cannot be generated in the wave-shaping circuit 35. The wave-shaping circuit 35 detects the peak point of the received light signal and outputs the resultant digital signal to the time-distance conversion circuit 50.

Figure 8A:
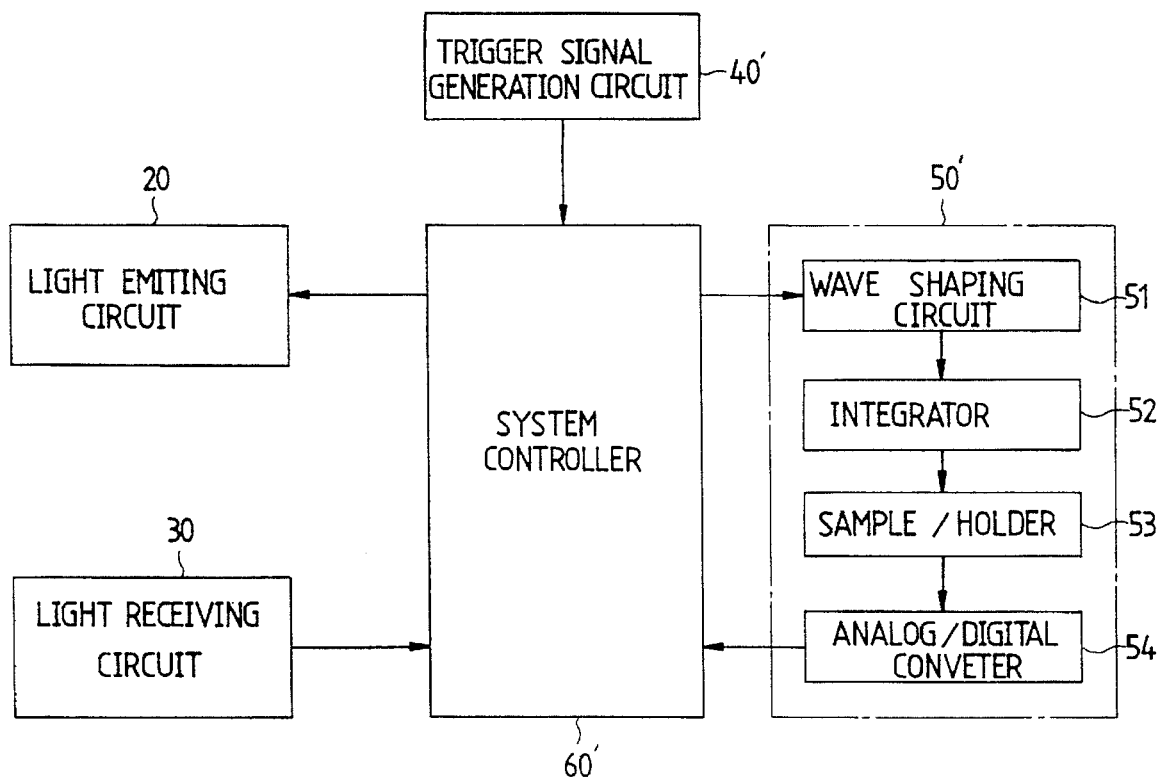
FIG. 8A is a block diagram of an optical distance measurement apparatus in accordance with a fourth embodiment of the present invention.

Referring to FIG. 8A, there is shown a block diagram of an optical distance measurement apparatus in accordance with a fourth embodiment of the present invention. Some of parts in this drawing are the same as those in FIGS. 1, 2A and 5. Therefore, like reference numerals designate like parts.

As shown in FIG. 8A, the optical distance measurement apparatus comprises the light emitting circuit 20 adapted to emit the high-power pulse light beam as the distance measuring medium and to direct same to the object 10 in response to the drive signal from the system controller 60.

The light receiving circuit 30 is adapted to receive the light beam reflected from the object 10.

The trigger signal generation circuit 40' is adapted to convert the pulse light beam from the light emitting circuit 20 into an electrical signal and to output the converted electrical signal as the trigger signal indicative of the start time point for the measurement of the light moving time.

A system controller 60' is adapted to control the entire system operation in response to the trigger signal from the trigger signal generation circuit 40'.

A time-distance conversion circuit 50' is adapted to measure the light moving time under the control of the system controller 60' and to convert the measured light moving time into the distance to the object 10.

The time-distance conversion circuit 50' includes a wave-shaping circuit 51 for wave-shaping the trigger signal from the trigger signal generation circuit 40', an integrator 52 for integrating an output signal from the wave-shaping circuit 51 to perform a time-voltage conversion operation, a sample/holder 53 for sampling and holding an output signal from the integrator 52 in response to the output signal from the light receiving circuit 30, and an analog/digital converter 54 for converting an output signal from the sample/holder 53 into a digital signal.

The operation of the optical distance measurement apparatus with the above-mentioned construction in accordance with the fourth embodiment of the present invention will hereinafter be described in detail with reference to FIGS. 9A to 9E, which are timing diagrams of the signals from the components in FIG. 8A.

The trigger signal generation circuit 40' converts the pulse light beam from the light emitting circuit 20 into the electrical signal and outputs the converted electrical signal as a trigger signal indicative of the start time point for the measurement of the light moving time.

Figure 9A:
FIGS. 9A to 9E are timing diagrams of signals from components in FIG. 8A.
Figure 9B:

The system controller 60' controls the laser diode driving circuit 22 so that it drives the laser diode 21 to emit the high-power pulse light beam and to direct same to the object 10. Also, the system controller 60' converts the trigger signal from the trigger signal generation circuit 40' into a digital pulse signal as shown in FIG. 9A and to convert the output signal from the light receiving circuit 30 into a digital pulse signal as shown in FIG. 9B. The digital pulse signals as shown in FIGS. 9A and 9B are then transferred from the system controller 60' to the time-distance conversion circuit 50'.

Figure 9C:
Figure 9D:

In response to the digital pulse signals from the system controller 60' as shown in FIGS. 9A and 9B, the time-distance conversion circuit 50' integrates the light moving time to convert it into a voltage. Namely, in the time-distance conversion circuit 50', the wave-shaping circuit 51 wave-shapes the digital pulse signal from the system controller 60' as shown in FIG. 9A and outputs the resultant signal as shown in FIG. 9C to the integrator 52. The integrator 52 integrates the output signal from the wave-shaping circuit 51 as shown in FIG. 9C to perform the time-voltage conversion operation as shown in FIG. 9D. It should be noted that a linearity of the integrator 52 must be maintained to prevent generation of an error in the distance measurement at the subsequent stage.

Figure 9E:

Then, the time-voltage converted signal from the integrator 52 is converted into the distance to the object 10. Namely, the sample/holder 53 samples and holds the output signal from the integrator 52 upon receiving the output signal from the light receiving circuit 30 and outputs the resultant voltage value $V_{TV}$. The analog/digital converter 54 converts the output voltage value $V_{TV}$ from the sample/holder 53 into a digital value as shown in FIG. 9E, which is then converted into the distance to the object 10 under the control of the system controller 60.

As mentioned above, the distance calculation is performed by using the increase of the voltage with time. Namely, the lapse of time with the voltage increase can be seen from the characteristic of the integrator 52. Therefore, the light moving distance can be calculated on the basis of the lapse of time with the voltage increase.

Figure 8B:
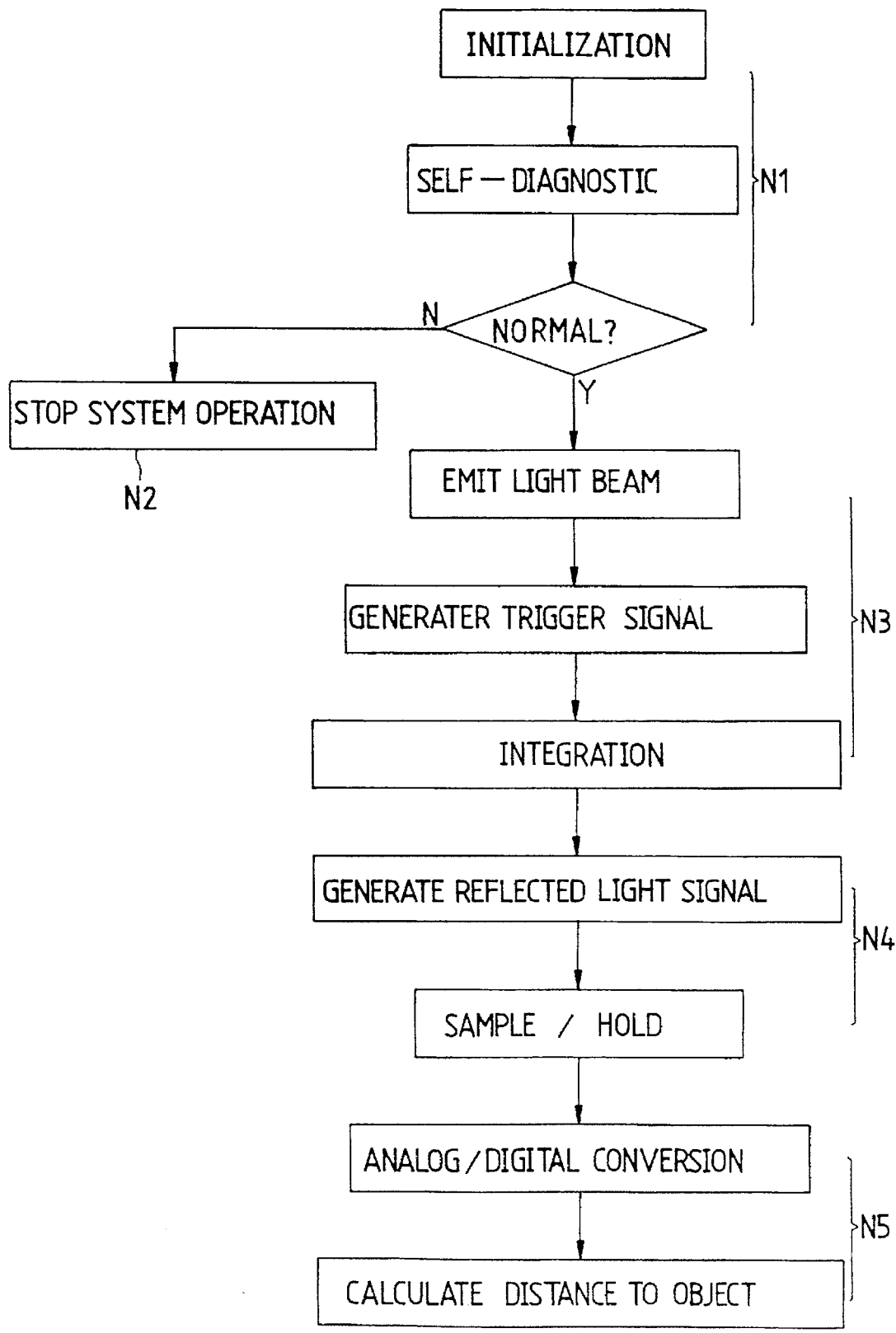
FIG. 8B is a flowchart illustrating an optical distance measurement method in accordance with the fourth embodiment of the present invention.

Referring to FIG. 8B, there is shown a flowchart illustrating an optical distance measurement method in accordance with the fourth embodiment of the present invention. At the step N1, the system is initialized and a self-diagnostic operation is performed to check whether the system is normal. If it is determined at the step N1 that the system is not normal, the operation of the system is stopped at the step N2. If it is determined at the step N1 that the system is normal, the high-power pulse light beam is emitted and directed to the object and the trigger signal is then generated at the step N3. At the step N4, the generated trigger signal is integrated so as to be converted into the voltage, and the converted voltage is sampled and held upon receiving the signal of the light beam reflected from the object. At the step N5, the sampled and held voltage is converted into the digital value and the converted digital value is then converted into the distance to the object.

As apparent from the above description, according to the present invention, the distance error resulting from the variation in the intensity of the light beam can be reduced. Also, the distance error can readily be corrected by adjusting simply the start time point for the measurement of the light moving time. Further, the distance measurement can precisely be performed even without detecting the peak point of the light beam. Moreover, a measurable range of the distance can be extended. Therefore, the long-distance measurement can precisely be performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical distance measurement apparatus, comprising:

system control means for controlling an entire operation of a system and for generating a drive signal;

light emitting means responsive to said drive signal for emitting a high-power pulse light beam for measurement of a distance to an object;

light receiving means for receiving a light beam reflected from the object and generating an output signal;

trigger signal generation means for generating a trigger signal indicative of a start time point for measurement of a light moving time; and time-distance conversion means for measuring the light moving time in response to the trigger signal from said trigger signal generation means and said output signal from said light receiving means, and for converting the measured light moving time into a distance to the object;

wherein said trigger signal generation means includes a variable signal delay circuit for delaying the drive signal from said system control means for a desired time and for outputting the delayed drive signal as the trigger signal to said time-distance conversion means, and a signal delay adjustment unit for varying a time constant of said variable signal delay circuit to adjust the delay time thereof;

wherein said light emitting means includes:

a laser diode as a light source for producing the high-power pulse light beam;

a laser diode driving circuit for driving said laser diode in response to the drive signal from said system control means; and a light emitting lens for focusing the light beam from said laser diode to produce a focused light beam and for diffusing the focused light beam at a desired angle so as to direct a diffused light beam to the object.

2. An optical distance measurement apparatus as set forth in claim 1, wherein said signal delay adjustment unit adjusts the desired time of said variable signal delay circuit such that the desired time becomes longer if the distance to the object desired by said time-distance conversion means is longer than an actual distance, and shorter if the distance to the object desired by said time-distance conversion means is shorter than the actual distance.

3. An optical distance measurement apparatus as set forth in claim 1, wherein said trigger signal generation means includes:

a photo diode for monitoring the high-power pulse light beam from said light emitting means to recognize a light emission time point and to provide an output signal;

an amplifier for amplifying the output signal from said photo diode to produce an amplified output; and a wave-shaping circuit for converting the amplified output from said amplifier into a digital signal and for outputting the digital signal to said time-distance conversion means.

4. An optical distance measurement apparatus as set forth in claim 1, wherein said time-distance conversion means includes:

a wave-shaping circuit for wave-shaping the trigger signal from said trigger signal generation means to produce an output signal;

an integrator for integrating the output signal from said wave-shaping circuit to perform a time-voltage conversion operation and to produce a time-voltage conversion output signal;

a sample/holder for sampling and holding the time-voltage conversion output signal from said integrator in response to the output signal from said light receiving means to produce a sample/holder output signal; and an analog/digital converter for converting the sample/holder output signal from said sample/holder into a digital signal.

5. An optical distance measurement apparatus, comprising:

system control means for controlling an entire operation of a system and for generating a drive signal;

light emitting means responsive to said drive signal for emitting a high-power pulse light beam for measurement of a distance to an object;

light receiving means for receiving a light beam reflected from the object and generating an output signal;

trigger signal generation means for generating a trigger signal indicative of a start time point for measurement of a light moving time; and time-distance conversion means for measuring the light moving time in response to the trigger signal from said trigger signal generation means and said output signal from said light receiving means, and for converting the measured light moving time into a distance to the object;

wherein said trigger signal generation means includes a variable signal delay circuit for delaying the drive signal from said system control means for a desired time and for outputting the delayed drive signal as the trigger signal to said time-distance conversion means, and a signal delay adjustment unit for varying a time constant of said variable signal delay circuit to adjust the delay time thereof;

wherein said light receiving means includes:

a light receiving lens for condensing the light beam reflected from the object;

an infrared-ray filter for filtering the light beam condensed by said light receiving lens by passing only a part thereof, corresponding to the diffused light beam emitted from said light emitting means, so as to remove an external light beam therefrom;

a photo diode for performing a photoelectric conversion operation for the light beam filtered by said infrared-ray filter to produce an electrical signal;

an amplifier for amplifying the electrical signal from said photo diode to produce an amplified output signal; and a wave-shaping circuit for converting the amplified output signal from said amplifier into a digital signal and for outputting the converted digital signal to said time-distance conversion means.

6. An optical distance measurement apparatus as set forth in claim 5, wherein said light receiving means further includes:

a sensitivity time control circuit connected between said amplifier and said wave-shaping circuit to increase an amplification degree of the amplified output signal from said amplifier in proportion to time.

7. An optical distance measurement apparatus as set forth in claim 5, wherein said light receiving means further includes:

a gain variation circuit and an automatic gain control circuit connected between said amplifier and said wave-shaping circuit, said gain variation circuit increasing a gain of said amplifier with a lapse of time so as to produce an output waveform and to prevent a short-distance error due to a fixed amplification degree, said automatic gain control circuit controlling automatically the gain of said amplifier to make the output waveform from said gain variation circuit constant.

8. An optical distance measurement apparatus as set forth in claim 7, wherein said gain variation circuit includes:

a ramp signal generator for generating a voltage signal in response to a ramp control signal; and a voltage-controlled amplifier responsive to said voltage signal from said ramp signal generator for controlling the gain of said amplifier.

9. An optical distance measurement apparatus as set forth in claim 5, wherein said signal delay adjustment unit adjusts the desired time of said variable signal delay circuit such that the desired time becomes longer if the distance to the object desired by said time-distance conversion means is longer than an actual distance, and shorter if the distance to the object desired by said time-distance conversion means is shorter than the actual distance.

10. An optical distance measurement apparatus as set forth in claim 5, wherein said trigger signal generation means includes:

a photo diode for monitoring the high-power pulse light beam from said light emitting means to recognize a light emission time point and to provide an output signal;

an amplifier for amplifying the output signal from said photo diode to produce an amplified output; and a wave-shaping circuit for converting the amplified output from said amplifier into a digital signal and for outputting the digital signal to said time-distance conversion means.

11. An optical distance measurement apparatus as set forth in claim 5, wherein said time-distance conversion means includes:

a wave-shaping circuit for wave-shaping the trigger signal from said trigger signal generation means to produce an output signal;

an integrator for integrating the output signal from said wave-shaping circuit to perform a time-voltage conversion operation and to produce a time-voltage conversion output signal;

a sample/holder for sampling and holding the time-voltage conversion output signal from said integrator in response to the output signal from said light receiving means to produce a sample/holder output signal; and an analog/digital converter for converting the sample/holder output signal from said sample/holder into a digital signal.

\* \* \* \* \*